Jan. 12, 1965   H. W. HART   3,165,025
LAMP MOUNTING FOR PHOTOGRAPHIC APPARATUS
Filed Jan. 11, 1962   2 Sheets-Sheet 1

INVENTOR.
Halton W. Hart
BY William E. Nobbe
ATTORNEY

Jan. 12, 1965 H. W. HART 3,165,025
LAMP MOUNTING FOR PHOTOGRAPHIC APPARATUS
Filed Jan. 11, 1962 2 Sheets-Sheet 2

INVENTOR.
Halton W. Hart
BY
William E. Nobbe
ATTORNEY

United States Patent Office 3,165,025
Patented Jan. 12, 1965

3,165,025
LAMP MOUNTING FOR PHOTOGRAPHIC
APPARATUS
Halton W. Hart, 2250 Maplewood Ave., Toledo, Ohio
Filed Jan. 11, 1962, Ser. No. 165,550
9 Claims. (Cl. 88—24)

This invention relates broadly to apparatus for making photographic reproductions and more particularly has to do with improved lamp mounting structures for such apparatus.

The principal object of this invention resides in the provision of an improved mounting structure for lamps of photographic apparatus and means for accurately locating the lamps in angular relation to the photograph to be reproduced.

Another object of the invention is to provide an improved mounting structure having means for automatically connecting the lamps to an electric circuit simultaneously with positioning of the lamps in proper angular relation to the area to be illuminated.

Another object of the invention is to provide a lamp mounting structure of the above character having means for adjusting the distance of the lamps from the field of the subject to be reproduced, said means including telescopic members adapted to maintain the electric circuits to the lamps at all times.

A further object of the invention is to provide a lamp mounting structure constructed of suitably rigid members to enable rapid and easy movement from the operative position to a compact arrangement for handling and storage.

Other objects and advantages of the invention will become more apparent during the course of the following description when taken in connection with the accompanying drawings.

In the drawings, wherein like numerals are employed to designate like parts throughout the same:

Figure 1:
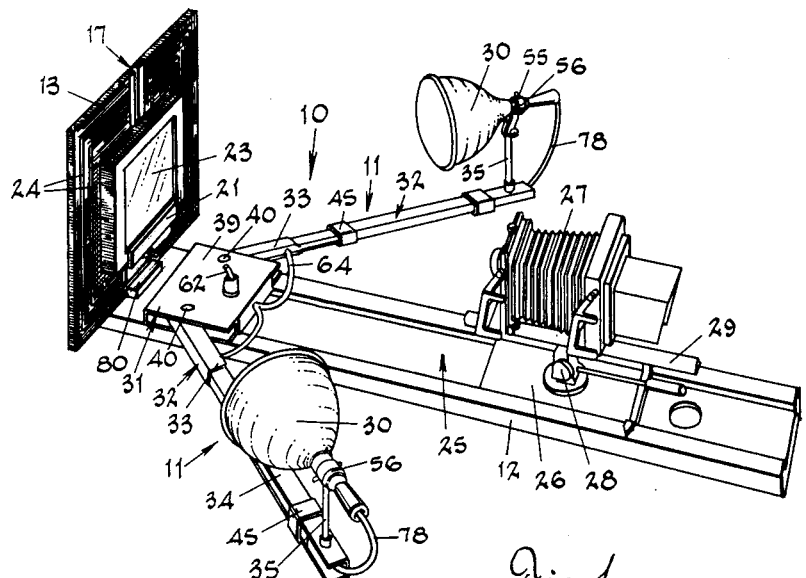
FIG. 1 is a perspective view of photographic apparatus with lamp mounting structures constructed in accordance with the invention.
Figure 3:
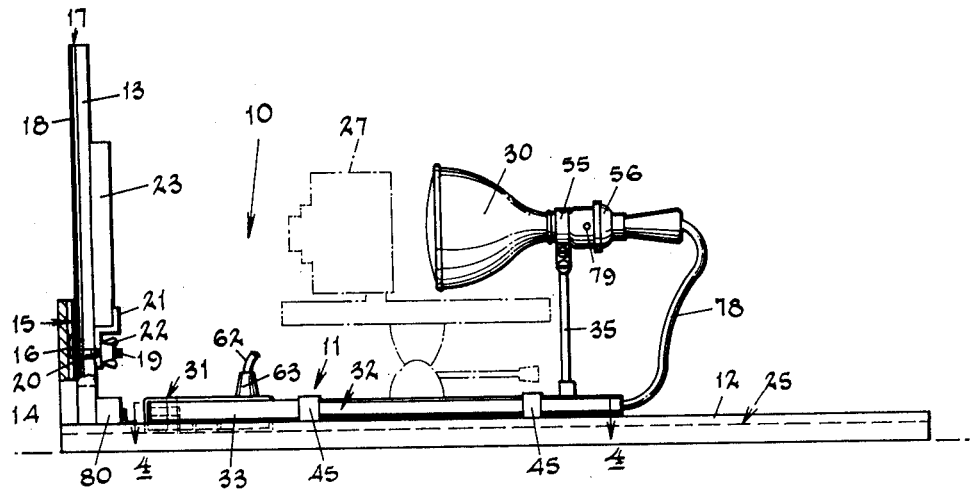
FIG. 3 is a side elevation of the apparatus, parts thereof being shown in cross section.

Referring now more particularly to FIG. 1, there is shown a photographic apparatus 10 having lamp mountings constructed in accordance with the present invention; each mounting being designated in its entirety by the numeral 11. The apparatus 10 comprises a base platform 12 which at one end is equipped with a support board or easel 13. This is vertically supported on platform 12 by a rear wall 14 provided with a vertical groove 15 in one surface thereof. As shown in FIG. 3, the adjoining rear surface of the easel has a stud 16 adapted to be received in the slot 15 and thus permit easy installation or removal thereof. Similarly, said easel is provided with a vertical slot 17 in the center area thereof which is closed by a plate 18. The slot 17 is adapted to receive a short bolt 19 having a head 20 located in the slot 17 and associated with a mounting bracket 21. A wing-nut 22 is employed on the bolt 19 to secure the bracket 21 which carries a picture mount or copy holder 23 in any position to which it may be located with reference to the easel 13. As shown in FIG. 1, the forwardly facing surface of the easel is finished with a dark, dull or matte material on which a plurality of picture sizes are outlined by white lines 24.

Figure 2:
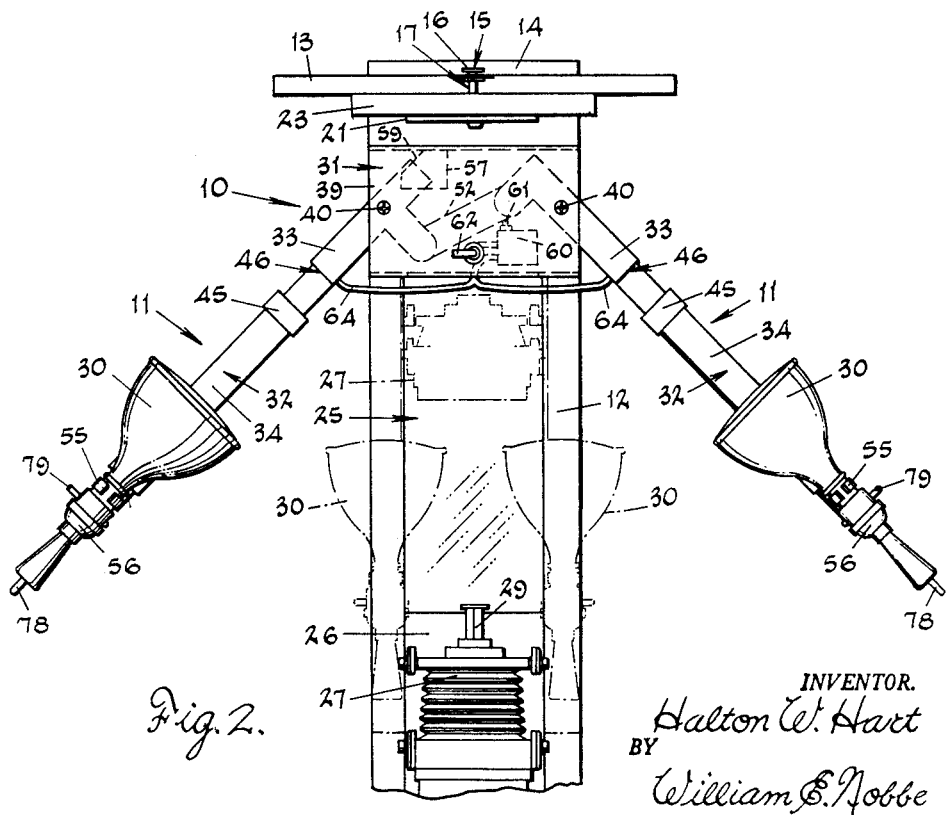
FIG. 2 is a plan view of the apparatus with the lamp mounting structures shown in their operative positions by full lines and in position for storage by broken lines.

In the upper surface of the base 12, a way 25 is formed for sliding movement of a panel 26 on which a camera 27 is supported. Although the particular type of camera or its mounting on panel 26 forms no part of the instant invention, it may be briefly said that the camera is carried on a pedestal 28 and adjustably swung by means of a handle. The pedestal also includes a horizontally disposed rail or bar 29 on which the camera can be bodily mounted. As is believed well known, in the art the panel 26 can be moved forwardly or rearwardly in the groove 25 to initially locate the camera relative to the picture to be reproduced and the camera then adjustably moved along the bar 29 and otherwise moved into a desired position of focus by adjustment of the pedestal mount 28. The camera can thus be moved from an inoperative position indicated in broken line position in FIG. 2 to an operative position such as one wherein the camera is shown in full line.

Figures 4, 5, 6, 7:
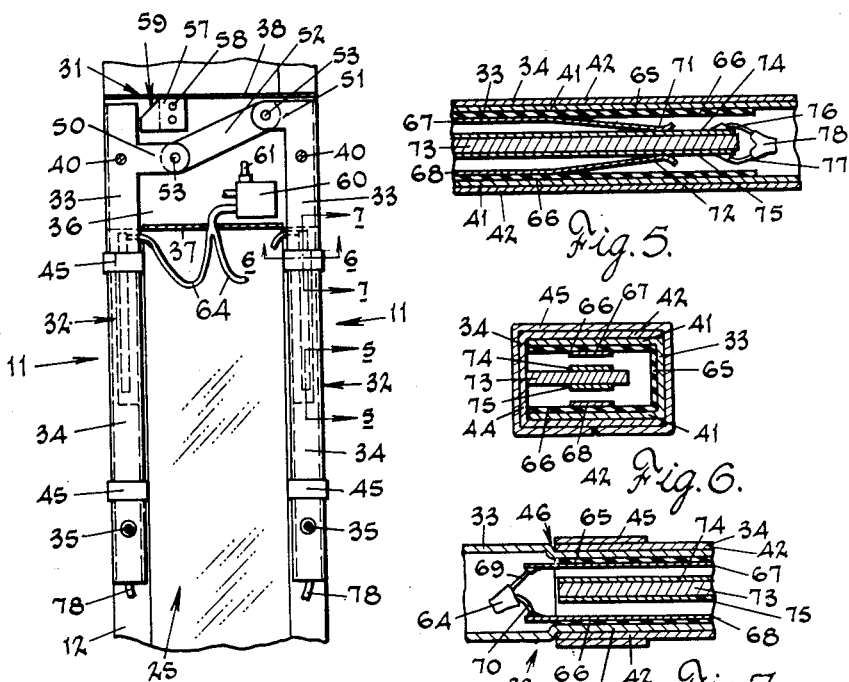
FIG. 4 is a horizontal sectional view taken on line 4—4 of FIG. 3.
FIG. 5 is a longitudinal vertical view taken on line 5—5 of FIG. 4.
FIG. 6 is a transverse vertical view taken on line 6—6 of FIG. 4.
FIG. 7 is a longitudinal vertical sectional view taken on line 7—7 of FIG. 4.

The mounting structures 11 for the lamps 30 include a support member or casing 31, a support arm 32 including telescopically associated rails 33 and 34 and a post 35 secured to the rail 34. More particularly, the casing 31 is a substantially rectangular member, fixedly mounted on the base and including a floor 36, a front wall 37, rear wall 38 and top wall 39. Each of the support arms 32 is pivotally supported between the floor 36 and top wall 39 by screw 40. As viewed in FIG. 6, the rails 33 and 34 are U-shaped members with the legs 41 of the rail 33 being slidably contained between the legs 42 of the rail 34. This positions the web 43 of rail 33 in parallel and oppositely disposed relation to the web 44 of rail 34. When assembled as illustrated in FIG. 6, the rails are maintained in their interfitting relationship by bands 45, bent rectangularly about the web 44 and legs 42 of rail 34 and the web 43 of rail 33 located between the outer ends of legs 42. This affords a substantially rigid support arm 32 having a substantially closed appearance on all four of its sides. And since the bands 45 are arranged in spaced relation to one another, the rail 34 can be moved outwardly or inwardly with respect to the rail 33 in moving the lamps 30 from their inoperative to their operative positions. As shown in FIG. 7, the rail 34 is formed with a shoulder 46 by suitable bending of the legs 41 to create a stop against which the rail 34 will be halted in its inner movement. A limiting means can if desired also be provided to restrict outward movement of the rail 34.

At the ends of the rails 33 contained within the case 31 and pivotally mounted on screws 40, inwardly directed arms 50 and 51 are provided; said arms being linked together by a bar 522. The arms 50 of one rail 33 is so located with respect to the arm 51 of the other rail 33 that upon motion of one rail about its pivotal screw 40, the bar 52 will cause a related motion of the other rail in an opposed but equal degree of angular motion. In other words, upon manually created movement of one arm 32 from the broken line position of FIG. 2 to the full line position, the oppositely disposed arm 32 will be caused to follow without necessitated handling thereof.

At the free or outer end of the rail 34 of each support arm 32, a lamp 30 is mounted on the aforementioned post 35. As shown in FIG. 3, a clamping bracket 54 is carried at the top of each post 35 with gripping portions 55 encircling the socket receptacle 56 of the lamp. The lamps 30 are thus mounted on the support arms 32 so that the distance from the surface of the picture mount 19 can be lengthened or shortened by movement of the rail 34 relative to the associated rail 33. Accurate angular location of the lamps with respect to the plane of the surface of the picture mount to properly illuminate the photograph therein is also determined by swinging of the arms 32 about the screws 40 and with the arms being equally moved through the bar 52. In order to positively locate the lamps so that the light beams therefrom will be directed along lines at an optimum angle of 45° to the surface of the picture mount as well as an equal angle of 45° with reference to the focal line between the camera and said mount, a stop member 57 is provided within the case to engage the adjacent end of one rail 33 when the desired angle has been reached. For this purpose, as viewed in FIG. 4, member 57 is secured to the floor 36 of case 31 by pins 58 and is provided with an angularly-disposed surface 59 which will engage the inner surface of the web 43 of the proximate rail 33.

One of the novel aspects of this invention resides in the fact that the lamps 30 can be moved to and from their operative positions on substantially rigid support members or arms and that they can be moved longitudinally of the arms to adjust their distance from the picture mount. Additionally, and in view of their interlinked connection by bar 52, the support arms are adapted to be pivotally and equally swung to the desired angular position. However, since movement of the arms may be inadvertently halted before this desired and necessary angular position is obtained, means is herein provided for preventing operation of the lamp or illumination of the subject photograph until the arms have been jointly swung until motion of at least one arm has been limited by the stop member 57. For this purpose, a limit switch 60 is mounted within the case 41 in such position that its actuating plunger 61 will operate to effect closure of the switch circuit only and simultaneously with engagement of the respective rail 33 with the said stop member 57.

The electric circuit controlled by switch 60 is supplied from an external service line through an electric cord 62 connected through a plug 63, mounted on the top wall 39 of the case 31, to the switch 60. The circuit lines to each of the lamps 30 is completed by way of individual cords 64 which are passed through a suitable opening in the front wall 37 of case 31. To permit operative connection of each lamp 30 to the switch 60 and yet enable lengthening or shortening of the support arms 32, the rails 33 and 34 thereof are equipped with sliding contactors. As shown in FIGS. 5, 6 and 7, the rails 33 is shown as fitted with a suitably bent strip 65 of insulation material to each leg 66 of which is secured a strip conductor 67 and 68. As viewed in FIG. 7, one or the "inner" end of each conductor 67 or 68 is attached to an individual wire 69 or 70 of the cord 64. The opposite end of each conductor 67 and 68 is bent inwardly to provide a spring-flexed contact 71 or 72 adapted to maintain engagement with similar conductors completing an electric circuit to the respective lamp 30. For this purpose, the web 44 of each rail 34 supports a bar 73 of insulation or dielectric material which on its oppositely disposed horizontal surfaces carries fixedly secured conductor strips 74 and 75.

The conductor strips 74 and 75 have connected at their ends (FIG. 5) to the related wires 76 and 77 of an electric cord 78. This cord in each instance, is connected in receptacle 56 to the lamp contacts whereby the circuit of the associated lamp can be conventionally closed and opened by the finger engageable buttons 79. In order that the contacts 71 and 72, in addition to their inherent flexing characteristics, will be maintained in engagement with the conductors 74 and 75, the insulator bar 73 can be made from a resilient and expandable material which will urge the said conductors into positive engagement with the contacts while the conductors are moved therepast. Accordingly, when the rail 34 of each support arm 32 is moved relative to the associated rail 33, the conductors 74 and 75 will be carried in sliding engagement with the fixedly mounted contacts 71 and 72. This will operate to continuously maintain electrical service between the switch 60 and the lamps 30. However, as pointed out hereinabove, the circuitry to the lamps, although closed by the buttons 79, will not be completed through the switch 60 until the bar 52 engages the switch plunger 61. And this engagement is only established when the arms 32 have been swung into proper angular positions relative to the photograph in mount 19 which position is accurately determined by the stop member 57.

In use, the easel 13 is attached to the rear wall 14 of the base 12 by downward insertion of the stud 16 into the groove 15. A hingedly mounted keeper block 89 on the base 12 is then employed to secure the easel in its vertical position. Preparatory to locating the photograph to be reproduced in the holder 23, the wing-nut 22 is released and the copy holder 23 is adjusted upwardly or downwardly until the focal center of the photograph is substantially located in the optical axis of the camera 27. This positioning of the copy holder 23 can be easily achieved in most instances by registration of said mount with one or the other of the outlines 24 on the dark surface of the easel 13. This relation of the picture to the camera when the same is in an operative position can be determined in the usual manner by lighting the picture through the camera lens. Further minor adjustments in the vertical position of the bracket 21 can be made after the copy holder 23 is placed thereupon to properly locate the picture therein in the focal axis of the camera. Also the support arms 32 are swung outwardly from the base 12 and into the full line positions shown.

Now due to the improved structure and mounted relation of the support arms, the lamps 30 will not be illuminated until the arms have been equally moved to the proper angular relation with reference to the focal axis of the camera as well as the plane of the photograph to be reproduced. This is obtained by engagement of the stop member 57 at which time the bar 52 will simultaneously depress the actuator plunger 61 to complete an electric circuit through the switch 60. During the inward and outward movement of the lamps 30, to provide the best illumination for the material in the picture mount, upon longitudinal sliding of the rail 34 with reference to the rail 33, the electric circuits to the lamps 30 will be maintained by the engagement of the spring flexed contactors 71 and 72 with the conductors 74 and 75. Temporary control of the lamps 30 can of course also be obtained by the push buttons 79 in the respective lamp receptacles 56.

It is therefore believed entirely clear that the lamp mounting structure of this invention permits the use of photographic apparatus by persons not having commercial or expert practice in making satisfactory reproductions without making repeated adjustments and unnecessary trials by error. While the proper focusing of the camera may be easily obtained after some practice, it has been found that one of the difficulties not readily apparent to the inexperienced operator is that the sources of illumination must be directed in proper relation with the camera and to the mounted photograph. Such difficulty is herein eliminated since the illuminating lamps cannot be put into use until they have been positively located at which time the electric circuit thereto is automatically completed. This prevents inadvertent improper positioning of the lamps by the experienced as well as the inexperienced user of photographic apparatus.

It is to be understood that the forms of the invention herewith shown and described are to be taken as illustrative embodiments only of the same, and that various changes in the shape, size and arrangement of parts may be resorted to without departing from the spirit of the invention.

I claim:

1. In photographic apparatus, in combination, a supporting base, a copy holder carried by the base adjacent one end thereof and a camera movably mounted on said base in spaced relation to said copy holder, a support member secured to the base between the camera and copy holder and adjacent the latter, a pair of supporting arms positioned at opposite sides of said base, means for pivotally connecting the inner end of each arm to said support member so that said arms can swing outwardly and inwardly relative to said base, a pair of lamps, one lamp being carried by each of said supporting arms, an electric circuit, a switch in said electric circuit connected to each of the lamps, means connecting said arms together for simultaneous inward and outward swinging movement, means for limiting the outward swinging movement of said arms, and means for actuating said switch when said arms reach a predetermined angular position to close the circuit through said lamps.

2. In photographic apparatus as defined in claim 1, in which the means for limiting the outward swinging movement of the supporting arms is carried by said support member in such position as to be engaged by at least one of said arms when the lamps carried by said arms are arranged at a predetermined angle to said copy holder.

3. In photographic apparatus as defined in claim 1, in which the means for limiting the outward swinging movement of the supporting arms comprises a fixed element mounted in proximity to the inner ends of said supporting arms and having an angled surface in position to be engaged by at least one of said arms when the lamps carried by the said arms are arranged at a predetermined angle to said copy holder.

4. In photographic apparatus as defined in claim 1, in which said switch is carried by said support member and also in which the means connecting the supporting arms together comprises a link pivotally connected at its opposite ends to the inner ends of said arms for actuating said switch when the lamps carried by said arms are arranged at a predetermined angle to said copy holder.

5. In photographic apparatus, in combination, an elongated support base, a copy holder carried by the base adjacent one end thereof and a camera movably mounted on said base in spaced relation to said copy holder, a support member secured to the base between the camera and copy holder and adjacent the latter, a pair of horizontal supporting arms positioned at opposite sides of said base, means for pivotally connecting the inner end of each arm to said support member so that said arms can swing outwardly and inwardly relative to said base, a pair of lamps, one lamp being carried by each of said supporting arms, a link pivotally connected at its opposite ends to the inner ends of said arms such that swinging movement of either arm will produce simultaneous and equal swinging movement of the other arm in an opposite direction, means for limiting the outward swinging movement of said arms, an electric circuit, and a switch in said electric circuit connected to each of the lamps and adapted to be actuated by said link when said arms are swung outwardly and the lamps carried thereby are arranged at a predetermined angle to said copy holder.

6. In photographic apparatus as defined in claim 1, in which each of said arms is formed of at least two telescoping sections, one telescopic section being pivoted at its end to said support member for swinging movement relative thereto and a second telescopic section slidably interfitting with the first telescopic section, a lamp supporting post carried adjacent the outer end of said second telescopic section, means for securing the telescopic sections for sliding movement relative to one another, and means for maintaining the electric circuit to said lamps during relative sliding movement of said telescopic sections.

7. In photographic apparatus as defined in claim 6, in which each of said telescopic sections includes a web and oppositely disposed legs, electrical insulating material covering the inner surfaces of the legs of the first telescopic section and a strip contact secured to the electrical insulating material on each of said legs, each strip contact being connected at one end to one side of the electric circuit, di-electric means carried by the web of the second telescopic section, and a second pair of strip contacts carried by said di-electric means, said second strip contacts being in circuit with the lamp on the respective arm, the opposite ends of each of the first strip contacts being formed to resiliently engage the second strip contacts to maintain an electric circuit through the lamp during sliding movements of the second telescopic section relative to the first telescopic section.

8. In photographic apparatus, in combination, an elongated support base, a copy holder carried by the base adjacent one end thereof and a camera slidably mounted on said base in adjustably spaced relation to said copy holder, a support member secured to the base between the camera and copy holder and adjacent the latter, a pair of elongated horizontal supporting arms, positioned at opposite sides of said base, means for pivotally connecting the inner end of each arm to said support member so that said arms can swing horizontally outwardly and inwardly relative to said base, a pair of lamps, one lamp being carried by each of said supporting arms, a link pivotally connected at its opposite ends to the inner ends of said supporting arms such that swinging movement of either arm will produce simultaneous and equal swinging movement of the other arm in an opposite direction, means carried by the support member and engageable by at least one of the said arms for limiting the outward swinging movement of said arms, an electric circuit, a switch in said electric circuit connected to each of the lamps and actuated by said link when said arms are swung outwardly and the lamps carried thereby are arranged at a predetermined angle to said copy holder, each of said supporting arms being formed of at least two telescoping sections, one telescopic section being pivoted at its inner end to said support member for swinging movement relative thereto and a second telescopic section slidably interfitting with the first telescopic section, a lamp supporting post carried adjacent the outer end of said second telescopic section, means for securing the telescopic sections for sliding movement relative to one another, and means for maintaining the electric circuit to said lamps during relative sliding movement of said telescopic sections.

9. In photographic apparatus as defined in claim 8, in which the means for limiting the outward swinging movement of the supporting arms comprises a fixed element mounted in proximity to the inner ends of said arms and having an angled surface positioned to be engaged by at least one of said arms, and each of said telescopic sections includes a web and oppositely disposed legs, electrical insulating material covering the inner surfaces of the legs of the first telescopic section and a strip contact secured to the electrical insulating material on each of said legs, each strip contact being connected at one end to one side of the electric circuit, di-electric means carried by the web of the second telescopic section, and a second pair of strip contacts carried by said di-electric means, said second strip contacts being in circuit with the lamp on the respective arm, the opposite ends of each of the first strip contacts being formed to resiliently engage the second strip contacts to maintain an electric circuit through the lamp during sliding movements of the second telescopic section relative to the first telescopic section.

References Cited by the Examiner
UNITED STATES PATENTS

| 1,804,771 | 5/31 | Hopkins. |
| 2,596,376 | 5/52 | De Goeij. |
| 2,629,813 | 2/53 | Murphy _____ 88—24 X |
| 2,866,380 | 12/58 | Bing et al. |

NORTON ANSHER, *Primary Examiner.*

EMIL G. ANDERSON, *Examiner.*